(12) United States Patent
Gröppel et al.

(10) Patent No.: US 9,771,464 B2
(45) Date of Patent: Sep. 26, 2017

(54) INSULATING MATERIAL FOR ROTATING MACHINES

(71) Applicant: SIEMENS AKTIENGESELLSCHAFT, München (DE)

(72) Inventors: Peter Gröppel, Erlangen (DE); Christian Meichsner, Buttenheim (DE)

(73) Assignee: SIEMENS AKTIENGESELLSCHAFT (DE)

( * ) Notice: Subject to any disclaimer, the term of this patent is extended or adjusted under 35 U.S.C. 154(b) by 62 days.

(21) Appl. No.: 14/390,820

(22) PCT Filed: Mar. 22, 2013

(86) PCT No.: PCT/EP2013/056017
§ 371 (c)(1),
(2) Date: Oct. 6, 2014

(87) PCT Pub. No.: WO2013/149850
PCT Pub. Date: Oct. 10, 2013

(65) Prior Publication Data
US 2015/0093499 A1  Apr. 2, 2015

(30) Foreign Application Priority Data
Apr. 5, 2012 (DE) .................. 10 2012 205 650

(51) Int. Cl.
| | |
|---|---|
| H02K 3/30 | (2006.01) |
| B32B 27/20 | (2006.01) |
| B32B 27/38 | (2006.01) |
| C08K 3/36 | (2006.01) |
| B82Y 30/00 | (2011.01) |
| H01B 3/40 | (2006.01) |
| C08K 3/22 | (2006.01) |
| H02K 15/12 | (2006.01) |
| C08L 63/00 | (2006.01) |
| C09D 163/00 | (2006.01) |

(52) U.S. Cl.
CPC ............ *C08K 3/36* (2013.01); *B82Y 30/00* (2013.01); *C08K 3/22* (2013.01); *H01B 3/40* (2013.01); *H02K 3/30* (2013.01); *H02K 15/12* (2013.01); *C08K 2003/2227* (2013.01)

(58) Field of Classification Search
None
See application file for complete search history.

(56) References Cited

U.S. PATENT DOCUMENTS

| | | | |
|---|---|---|---|
| 7,829,188 B2 | 11/2010 | Lin | |
| 8,343,270 B2 | 1/2013 | Jennrick et al. | |
| 2003/0114553 A1 | 6/2003 | Abuelyaman | |
| 2003/0187117 A1 | 10/2003 | Starkovich | |
| 2005/0096423 A1 | 5/2005 | Jennrich et al. | |
| 2005/0142349 A1 | 6/2005 | Cao | |
| 2005/0158557 A1 | 7/2005 | Noro | 428/413 |
| 2007/0191513 A1 | 8/2007 | Jenrich et al. | |
| 2007/0191556 A1* | 8/2007 | Eger | B82Y 30/00 525/533 |
| 2007/0232727 A1* | 10/2007 | Lin | B82Y 30/00 523/440 |
| 2008/0306203 A1 | 12/2008 | Adam et al. | 524/493 |
| 2009/0170998 A1 | 7/2009 | Gupta | |
| 2011/0098383 A1 | 4/2011 | Albert et al. | |
| 2012/0071586 A1 | 3/2012 | Goenner | |
| 2013/0157042 A1 | 6/2013 | Brockschmidt et al. | |
| 2015/0101845 A1 | 4/2015 | Gröppel et al. | 3/40 |

FOREIGN PATENT DOCUMENTS

| | | |
|---|---|---|
| CN | 101506301 A | 8/2009 |
| CN | 103814415 A | 5/2014 |
| DE | 10345139 A1 | 4/2005 |
| DE | 102008030904 A1 | 12/2009 |
| DE | 10 2009 053 253 A1 | 5/2011 |
| DE | 102010019721 A1 | 11/2011 |
| EP | 1366112 B1 | 7/2004 |
| EP | 1773919 B1 | 11/2008 |
| EP | 2 058 366 A1 | 5/2009 |
| EP | 2058366 A1 | 5/2009 |
| JP | 2002-118991 A | 4/2002 |
| JP | 2005-126700 A | 5/2005 |
| JP | 2005-206664 A | 8/2005 |
| JP | 2005-206665 A | 8/2005 |
| JP | 2006-14490 A | 1/2006 |
| JP | 2006-351409 A | 12/2006 |
| JP | 2007-27101 | 2/2007 |
| JP | 2007-217623 A | 8/2007 |

(Continued)

OTHER PUBLICATIONS

International Search Report dated Sep. 5, 2013 issued in corresponding International Patent Application No. PCT/EP2013/056017.
Written Opinion dated Sep. 5, 2013 issued in corresponding International Patent Application No. PCT/EP2013/056017.
German Search Report dated Nov. 19, 2012 issued in corresponding German patent application No. 10 2012 205 650.5.
Office Action dated Nov. 13, 2015 issued in corresponding Chinese Patent Application No. 201380017741.4 (English translation only).

(Continued)

*Primary Examiner* — Michael J Feely
(74) *Attorney, Agent, or Firm* — Ostrolenk Faber LLP

(57) ABSTRACT

An insulating material and its method of use of insulating material for rotating machines such as motors and generators. The insulating material includes a resin embedded with a filler that is not based only on a monomodal nanoparticle size particle distribution. Radiation erodes the material and is conductive to the formation of in situ protective layers on the body to be insulated.

6 Claims, 2 Drawing Sheets

(56) References Cited

FOREIGN PATENT DOCUMENTS

| | | | |
|---|---|---|---|
| JP | 2008-75069 A | 4/2008 | |
| WO | WO 2008/129032 A1 | 10/2008 | |
| WO | WO 2011/100289 A1 * | 8/2011 | ............ C08K 9/06 |
| WO | WO 2013045212 A1 | 4/2013 | |

OTHER PUBLICATIONS

Search Report dated Nov. 13, 2015 issued in corresponding Chinese Patent Application No. 201380017741.4 (with English translation).
Office Action dated Oct. 26, 2015 issued in corresponding Japanese Patent Application No. 2015-503814.
"Glossary of Technical Terms in Japanese Industrial Standards, $5^{th}$ Edition", (5 pages total) (2001).

* cited by examiner

INSULATING MATERIAL FOR ROTATING MACHINES

CROSS-REFERENCE TO RELATED APPLICATIONS

The present application is a 35 U.S.C. §§371 National Phase conversion of PCT/EP2013/056017, filed Mar. 22, 2013, which claims priority of German Patent Application No. 10 2012 205 650.5, filed Apr. 5, 2012, the contents of which are incorporated by reference herein. The PCT International Application was published in the German language.

TECHNICAL FIELD

The invention relates to an insulating material and to the use of the insulating material for rotating machines such as motors and generators.

TECHNICAL BACKGROUND

Electrical machines, such as motors and generators, have electrical conductors, an electrical insulation, and a laminated stator core. The reliability of the insulating system here is critically responsible for their operational reliability. The insulating system has the function of insulating electrical conductors (wires, coils, bars) durably from one another and from the laminated stator core or the environment. Within high-voltage insulation, distinctions are made between insulation between partial conductors (partial conductor insulation), between the conductors or windings (conductor or winding insulation), and between conductor and ground potential in the slot and winding-head region (main insulation). The thickness of the main insulation is adapted both to the nominal voltage of the machine and to the operational and fabrication conditions. The competitiveness of future plants for energy production, their distribution and utilization, is critically dependent on the materials employed and technologies applied for the insulation.

The fundamental problem with insulators loaded electrically in this way lies in the so-called partial discharge-induced erosion. Under mechanical or thermal loading in the operation of the machine, cavities may form at the interfaces between the insulation and the conductor or between insulation and the laminated stator core, and sparks may form in these cavities as a result of electrical partial discharges. As a result of the sparks, "treeing" channels may be formed in the insulation. The treeing channels that form may lead ultimately to the electrical breakdown of the insulator. Against this background it is state of the art, for the durable insulation of the voltage-carrying conductors of the stators in rotating machines (motors, generators, turbogenerators, water power generators, wind power generators), to employ mica-based insulation systems.

High-voltage and medium-voltage motors and generators currently employ laminar mica insulation. In these systems, the form-wound coils produced from the insulated partial conductors are enwound with mica tapes and impregnated with synthetic resin primarily in a vacuum pressure impregnation (VPI) procedure. Here, mica is used in the form of mica paper, and in the course of the impregnation, the cavities located in the mica paper between the individual particles become filled with resin. The assembly formed of impregnating resin and mica carrier material provides the mechanical strength of the insulation. The electrical strength comes about from the multiplicity of solid-solid interfaces in the mica used. The resulting layering of organic and inorganic materials forms microscopic interfaces whose resistance to partial discharges and thermal stresses is determined by the properties of the mica platelets. As a result of the complicated VPI procedure, even very small cavities in the insulation must be filled fully with resin, in order to minimize the number of internal gas-solid interfaces.

For the additional improvement of the resistance, the use of nanoparticulate fillers is described. It is known from the literature (and through experience when using mica) that inorganic particles, in contrast to the polymeric insulating material, become damaged or destroyed only to a greatly restricted extent, or not at all, on exposure to partial discharge. The resultant erosion inhibition effect is dependent on factors including the particle diameter and the particle surface which generates from it. It is found here that the greater the specific surface area of the particles, the greater the erosion inhibition effect on the particles. Inorganic nanoparticles have very high specific surface areas, at 50 $m^2/g$ or more.

Employed for this purpose are essentially the following technologies:
  vacuum pressure impregnation technology (VPI process)
  resin rich technology The principal difference between the two technologies is the construction and the production of the actual insulating system of the coils. Whereas the VPI system is complete only after impregnation and after curing of the winding in a forced-air oven, the leg of the resin rich coil, cured separately under temperature and pressure, constitutes a functioning and testable insulation system even before installation into the stator.

The VPI process operates with porous tapes, forming a solid and continuous insulating system under vacuum with subsequent exposure of the impregnating vessel to overpressure after curing in the forced-air oven.

In contrast to this, the manufacture of resin rich coils is more complex, since each coil leg or winding bar has to be manufactured individually in specific baking presses, leading to a specific increase in the costs of the individual coil. In this context, mica tapes are employed that are impregnated with a polymer insulating substance which is present at what is called a B-stage. This means that the polymer, usually aromatic epoxy resins (BADGE, BFDGE, epoxidized phenol novolaks, epoxidized cresol novolaks, and anhydrides or amines as hardeners), is partially crosslinked and is thus in a tack-free state, but on further heating is able to melt again and be ultimately cured, so as to be brought into the final shape. Since the resin is introduced in an excess, it is able, during the final pressing operation, to flow into all cavities and voids, in order to attain the corresponding quality of insulation. Excess resin is pressed out of the initial charge by the pressing operation. From the literature it is known that the use of nanoparticulate fillers in polymeric insulating materials leads to significant improvements in the insulation in respect of the electrical longevity.

EP 1366112 B1 describes a system which describes the production and properties of a nanoparticulate polymer. Described therein is a polymer with nanoparticulate filler based on silicon dioxide, with a distribution curve having a full width at half maximum of not more than 1.5 $d_{max}$.

A disadvantage of the solution proposed there is that the insulation proposed therein is not yet at an optimum in terms of the formation of a passivation coat. A passivation coat is formed by application of an insulating material when a polymer filled with nanoparticles is exposed to partial discharges. Under partial discharge load, the polymeric matrix degrades and releases the filler, in other words, for example, the nanoparticles, which then form a firmly adhering coat on the surface and hence passivate the elements coated with the insulation. In the case of the aforementioned EP 1366112 B1, the passivation coat takes a long time to form, and the agglomeration is incomplete.

SUMMARY OF THE INVENTION

It is an object of the present invention, therefore, to specify a filler for an insulating material that under partial discharge load, with degradation of the polymeric matrix, favors the formation of an erosion passivation protection coat.

The achievement of this object, and the subject matter of the present invention, is an insulating material comprising a formulation with a resin and embedded therein a nanoparticulate filler, characterized in that the filler is present in at least bimodal size distribution. A further subject of the invention is the use of an insulating material according to the invention for impregnating coil windings in rotating electrical machines, preferably in generators.

The insulating material in question is preferably one comprising a formulation polymerizable thermally and/or by UV light, with a nanoparticulate filler dispersed therein, for which filler the distribution curve has a full width at half maximum, characterized by transmission electron microscopy, of greater than 1.5 $d_{max}$.

A general finding of the invention is that an unfilled or mica-based insulating material based on polymeric resins exhibits rapid degradation of the polymeric matrix under partial discharge load. Through the use of erosion-resistant nanoparticles, such as aluminum oxide and silicon oxide, for example, the matrix is exposed, brought about by polymer degradation. Increasing erosion time is accompanied gradually by the formation of a firmly adhering, sheetlike layer on the coated surface of the body, consisting of a layer of exposed nanoparticles. As a result of this in situ passivation of the surface, the polymer beneath the passivation coat is protected from further partial discharge erosion. The formation of the passivation coat here is dependent to a particular degree on the size and the percentage fraction of the nanoparticles incorporated by dispersion, since the interparticle distance is critical for the degradation of the polymer matrix between the nanoparticles and hence for the formation of the passivation coat over time.

DESCRIPTION OF AN EMBODIMENT

Figure 1:
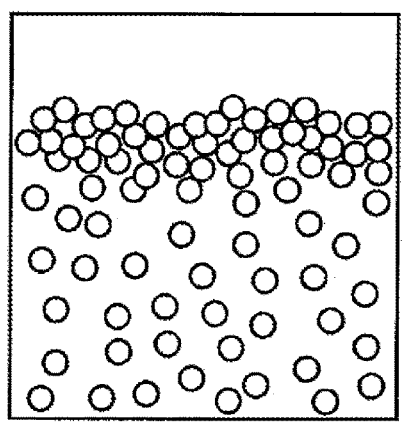
FIG. 1 shows a diagrammatic embodiment of the passivation coat by degradation of the polymeric matrix on a body surface coated with insulating material.

In FIG. 1 it is seen that the model of the passivation coat goes through a number of stages until a protective coat is formed. In the initial processes, the pure polymer between the nanoparticles is eroded, leading to concentration of the nanoparticles. A further absorption of energy in the form of partial discharges results in a local sintering operation on the part of the nanoparticles. Because of this mechanism, a ceramic layer is formed which protects the uneroded nanoparticulate polymer beneath from further erosion.

It has been possible to show that the use of at least two different kinds and/or sizes of nanoparticles, differing significantly in their particle diameters, leads to nanocomposites which have a particularly pronounced erosion resistance. A bimodal distribution is already of advantage here; in other embodiments, multimodal particle fractions are preferred.

Figure 2:
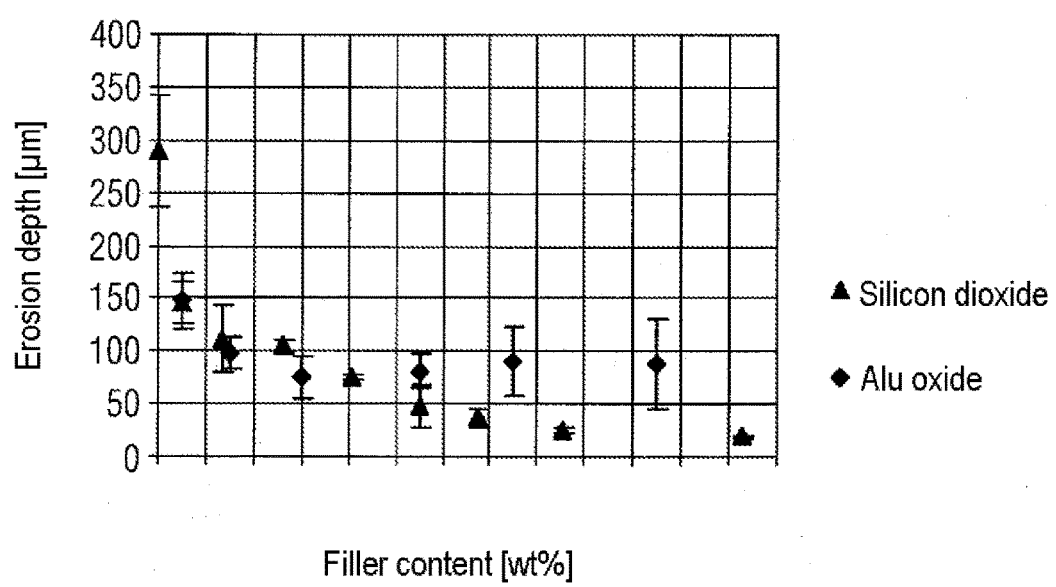
FIG. 2 shows the relationship between the erosion depth and the filler content.

This can be understood schematically in the above-simplified representation of FIG. 1 and of FIG. 2 for the formation of passivation coats. Under the influence of partial discharges, there is agglomeration of the nanoparticles through chemical or physical processes, ending in a passivating protective coat. The combination of at least two different sized nanoparticles reinforces this process, since, under the influence of TE, the nanoparticles with relatively low diameter and correspondingly enlarged active surface area support the agglomeration or local sintering processes, and therefore lead more quickly to the development of an erosion-resistant coat. This has the advantage that the concentration of nanoparticles with a small diameter can be kept low, this being valuable both economically and from a chemical standpoint, since it allows more effective control over properties such as viscosity, reactivity, and storage stability at the same time the positive properties, such as high specific surface area and smaller nanoparticles, for example, can be exploited.

In accordance with the invention, nanoparticles are dispersed in a resin, as for example an epoxy resin, which comprises a distribution curve having a full width at half maximum of not less than 1.5 $d_{max}$. According to one embodiment of the invention, therefore, the minimum half width at full maximum for the distribution curve is 1.55 $d_{max}$, more particularly 1.6 $d_{max}$, or even higher values.

This describes a particle distribution which encompasses not only one size of nanoparticles, but instead a plurality of particle size fractions.

According to one advantageous embodiment of the invention, the nanoparticles are dispersed monodispersely in the filler.

According to a further advantageous embodiment of the invention, the nanoparticles in the filler are based on a metal oxide, a semimetal oxide, and especially preferably on silicon dioxide and/or aluminum oxide.

According to a further advantageous embodiment of the invention, the polymeric matrix in which the filler is dispersed is an epoxy resin, as for example a diglycidyl ether based on bisphenols, such as bisphenol A and/or bisphenol F, for example.

According to one embodiment of the invention, the resin further comprises a hardener, as for example an acid anhydride hardener such as methyltetraphthalic anhydride and/or methylhexahydrophthalic anhydride.

According to a further advantageous embodiment of the invention, the resin further comprises an accelerator, as for example an amine derivative and/or a naphthenate.

According to a further advantageous embodiment of the invention, the filler comprises nanoparticle fractions having particle diameters in the range from 1 to 200 nm, more particularly from 1 to 150 nm, and very preferably in the range from 1 to 80 nm.

According to one advantageous embodiment of the invention, the filler is present with an average diameter $D_{50}$ of 1 to 500 nm, preferably of 1 to 300, especially preferably of 1 to 100 nm.

According to a further advantageous embodiment of the invention, the filler is present in the insulating material in an amount of 1 to 80 wt %, more particularly 1 to 60 wt %, and very preferably in the range from 1 to 50 wt % of the overall formulation.

The use of a particle fraction having a distribution curve with a full width at half maximum of more than 1.5 $d_{max}$ produces substantial advantages not only in the selection and manufacture of the nanocomposites but also in the quality assurance of the composites. The particle dispersions are prepared preferably by sol-gel operations. To establish the desired particle size distribution, it is also possible to employ a combination of different particle dispersions. The particle size is characterized according to the prior art, preferably a manual or automatic evaluation of the particle diameter on the basis of micrographs from transmission electron microscopy, TEM for short.

Figure 3:
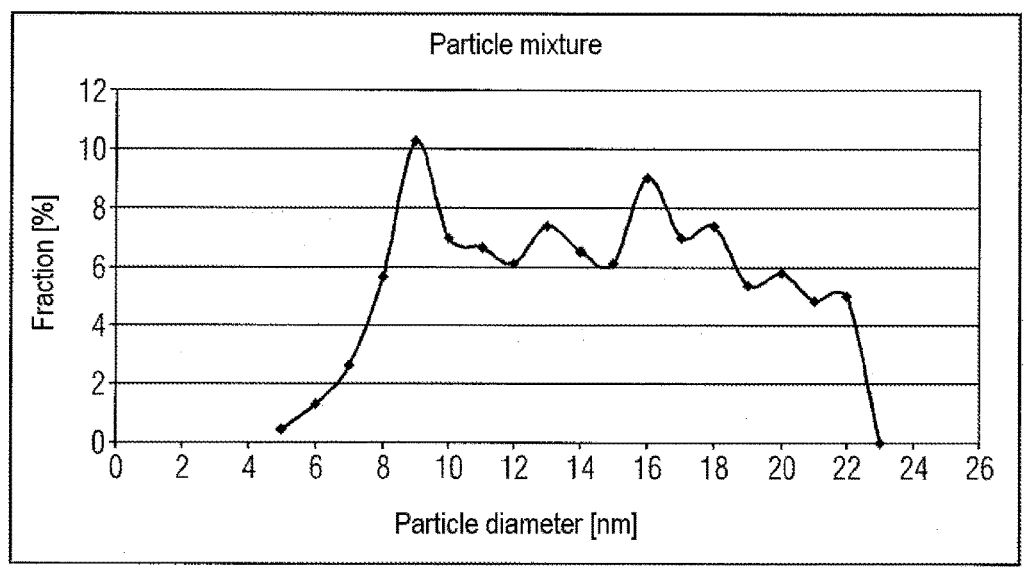
FIG. 3 shows the particle size distribution according to one exemplary embodiment of the invention.

FIG. 3 shows by way of example a particle size distribution of one working example of the invention. The particle system shown for the filler is reproduced graphically, through a representation of the percentage fraction of the respective powder fraction in intervals of 1 nm against the particle diameter. The particle mixture exhibits its $d_{max}$, in other words the peak in the distribution curve that has the greatest fraction relative to the corresponding particle size, at 9 nm. The full width at half maximum of the distribution curve is given by the width of the distribution curve in nm at half height relative to $d_{max}$. In this particle composition, the full width at half maximum of the distribution curve is found to be 1.6 $d_{max}$.

Figure 4:
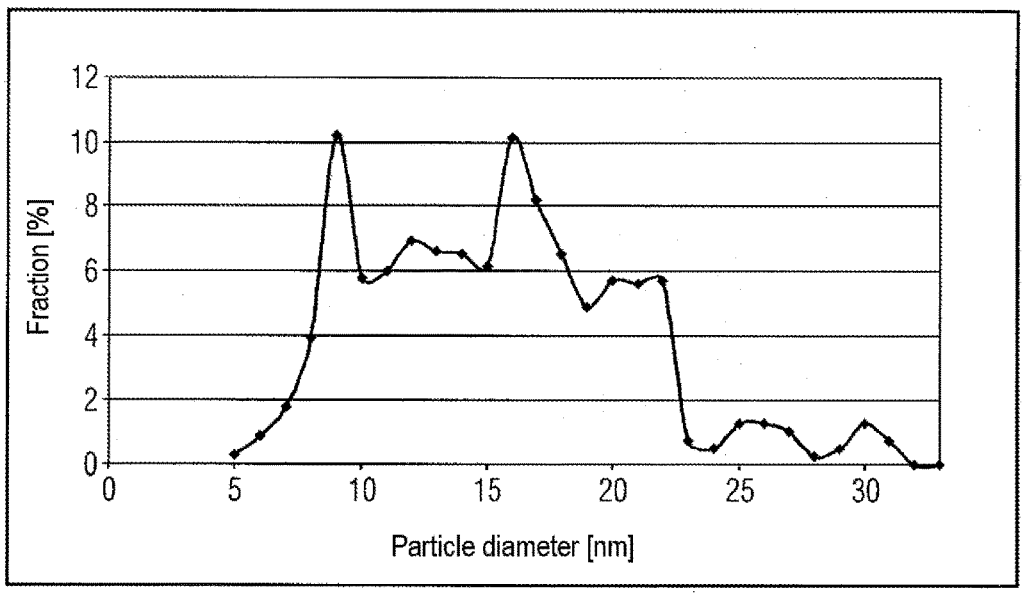
FIG. 4 shows a further particle size distribution of an exemplary embodiment of the invention.

FIG. 4, lastly, shows a comparable representation to that of FIG. 3, albeit of a different working example of the invention, in which a system is shown that comprises aluminum oxide particles and silicon dioxide particles. The size distribution set out in FIG. 4 shows a local $d_{max}$ at 9 nm. On this basis, the distribution curve has a full width at half maximum of 1.7 $d_{max}$.

The invention discloses for the first time an insulating material with a filler which is based not only on a monomodal nanoparticle size distribution. As a result, the formation of coats on the element to be insulated that provide protection in situ is greatly favored.

The invention claimed is:

1. A coil winding comprising a winding coated with a cured insulating material of a curable formulation comprising:
    a resin, and
    a nanoparticulate filler embedded in the resin,
    wherein the nanoparticulate filler is present in at least bimodal size distribution according to a distribution curve having a full distribution width at half maximum, as characterized by transmission electron microscopy, of greater than 1.5 $d_{max}$,
    wherein the nanoparticulate filler is configured to absorb energy in the form of partial discharges provided by the coil winding to build at least locally sintered parts.

2. The coil winding as claimed in claim 1, wherein the filler is present with an average diameter of from 1 to 500 nm.

3. The coil winding as claimed in claim 1, wherein the filler is present in an amount of 1 to 80 wt % of the formulation.

4. The coil winding as claimed in claim 1, wherein the resin is polymerizable thermally and/or by UV light.

5. The coil winding as claimed in claim 4, wherein the filler is present on the basis of a metal oxide and/or semi-metal oxide.

6. The coil winding of claim 4, wherein the resin is an epoxy resin.

* * * * *